3,069,435
ANABOLICALLY ACTIVE 2-CHLOR-Δ¹-ANDROSTEN-17-OL-3-ONES AND METHOD OF MAKING SAME
Rudolf Wiechert, Berlin-Lichterfelde, Emanuel Kaspar, Berlin-Wilmersdorf, and Martin Schenck, Berlin-Frohnau, Germany, assignors to Schering A.G., Berlin, Germany, a corporation of Germany
No Drawing. Filed Aug. 18, 1959, Ser. No. 834,398
Claims priority, application Germany Aug. 30, 1958
8 Claims. (Cl. 260—397.4)

This invention relates to novel anabolically active steroids and to the method of their preparation. More particularly the invention is concerned with 2-halogen derivatives of Δ¹-androstene-17-ol-3-ones and their 17-esters.

The manufacture of preparations which in addition to strong anabolic activity exhibit the least possible androgenic side-reactions, is of great significance for therapeutic purposes. There are already known certain steroids closely related to testosterone, which in comparison with testosterone exhibit a slightly greater anabolic activity while at the same time they possess notably lessened androgenic activity. Nevertheless, in the case of these steroids, the reduction of androgenic activity is not so marked that they can no longer be used in dosages such as to evoke an extensive anabolic action. The discovery of new compounds which shift the activity ratio in favor of anabolic activity therefore undoubtedly represents a significant advance in the art.

It was now found that the introduction of a halogen atom into the 2-position of the anabolically active Δ¹-androstene-17-β-ol-3-one and its 17-esters unexpectedly and surprisingly brings about such a shift in the activity ratio. Thus, for example, 2-chlor-Δ¹-androstene-17β-ol-3-one in comparison with the unchlorinated compound, while possessing approximately the same anabolic activity, shows a reduction in androgenic activity to approximately one-fifth.

The therapeutic utility of the new halogenated compounds has been established by clinical tests, which are summarized in the following Table I:

TABLE I

| Test No. | Compound | Dosage S.C. | Seminal vesicle, mg. | Levator ani, mg. | Ratio of levator ani to seminal vesicle |
|---|---|---|---|---|---|
| 1 | 2-chlor-Δ¹-androstene-17β-ol-3-one | 12×1,000γ | 79 | 70 | 0,9 |
| 2 | Δ¹-androstene-17β-ol-3-one | 12×1,000γ | 397 | 79 | 0,2 |
| 3 | 2-chlor-17α-methyl-Δ¹-androstene-17β-ol-3-one | 12×1,000γ | 122 | 60 | 0,5 |
| 4 | 17α-methyl-Δ¹-androstene-17β-ol-3-one | 12×1,000γ | 291 | 65 | 0,2 |
| 5 | 2-chlor-Δ¹-19-nor-androstene-17β-ol-3-one | 12× 100γ | 25 | 43 | 1,7 |
| 6 | Δ¹-19-nor-androstene-17β-ol-3-one | 12×1,000γ | 31 | 45 | 1,4 |
| 7 | 2-chlor-1-methy-Δ¹-androstene-17β-ol-3-one | 12× 100γ | 50 | 56 | 1,1 |
| 8 | 1-methyl-Δ¹-androstene-17β-ol-3-one | 12×1,000γ | 92 | 73 | 0,8 |

As seen from the data for compounds 1 and 2 in the table, the androgenic activity of Δ¹-androstene-17β-ol-3-one is diminished about one-fifth by chlorination in the 2-position, while the anabolic activity remains about the same. A comparison of compounds 3 and 4 indicates that with 17α-methyl-Δ¹-androstene-17β-ol-3-one the androgenic activity is decreased to one-third by chlorination and the anabolic activity remains the same. Comparison of compounds 5 and 6 shows that a dosage of 12×100γ of 2-chlor-Δ¹-19-nor-androstene-17β-ol-3-one shows the same anabolic activity as a dosage of 12×1000γ of Δ¹-19-nor-androstene-17β-ol-3-one with a slightly smaller androgenic activity. The relationship of compounds 7 and 8 is similar to that of compounds 5 and 6.

The hitherto undescribed 2-halogen-Δ¹-androstene-17-ol-3-one compounds can be prepared in accordance with known methods of steroid chemistry. A preferred starting material is 1,2-oxido-androstane-17β-ol-3-one. If this substance is treated, for example, with hydrogen chloride in chloroform, there is immediately formed instead of the chlorhydrin which might have been expected, its dehydration product, 2-chlor-Δ¹-androstene-17β-ol-3-one, in accordance with the following sequence:

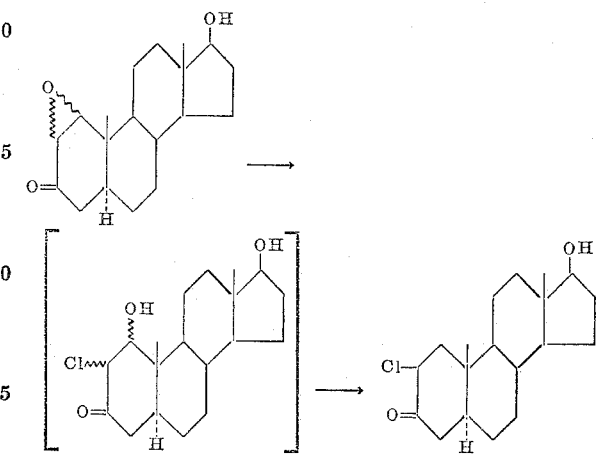

Other suitable starting materials include the alcoholysis products of 1,2-oxido-androstane-17-ol-one, particularly the methanolysis product, which is obtained, for example, from the foregoing oxido compound by treatment with methanol in presence of perchloric acid. When this compound is treated with hydrogen chloride in chloroform there is immediately formed, in an analogous manner, 2-chlor-Δ¹-androstene-17β-ol-3-one in accordance with the following sequence:

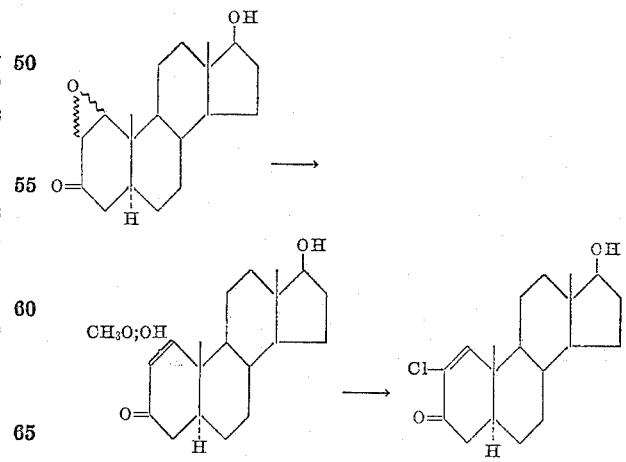

The transformation using other hydrogen halides in place of hydrogen chloride takes place in analogous manner. Another method of preparation includes the halogenation of the unhalogenated Δ¹-androstene-17-ol-3-one compound with a solution of a halogen in an aliphatic organic acid such as acetic acid or propionic acid. If desired, the 17-hydroxy groups of the new 2-halogen-$\Delta^1$-androstene-17-ol-3-ones can be acylated with any physiologically tolerable acid. Examples of such acids include: acetic, formic, propionic, butyne, oenanthic, caprylic, undecylenic, undecylic, trimethylacetic, cyclopentylpropionic, hexahydrobenzoic, benzoic, phenylpropionic, methoxyphenylacetic, caprinoxylacetic, tetrahydrofurane carboxylic, chloracetic, 4-chlorphenoxyacetic, alanine, succinic, hexahydrophthalic, sulfuric, and phosphoric acids.

The invention is illustrated by the following examples, but it is not to be considered as limited thereto:

*Example 1*

200 mg. of 1,2-oxido-androstane-17β-ol-3-one were dissolved in 25 ml. of alcohol-free chloroform. Dry hydrogen chloride gas was passed into this solution in the course of 2 hours and at a temperature of 0° C. The solution was then diluted with water and extracted with methylene chloride. The methylene chloride phase was washed with water until neutral and dried over sodium sulfate. After evaporation of the solvent the residue was rubbed with ether, filtered by suction, and recrystallized from ethyl acetate. 2-chlor - $\Delta^1$ - androstene-17β-ol-3-one melts at 221°–222° C. The ultra-violet reading is $\epsilon_{248}$=9500.

*Example 2*

3.2 grams of 1,2-oxido-androstane-17β-ol-3-one were allowed to stand in 200 ml. methanol with 1.3 ml. of 70% perchloric acid at room temperature for 16 hours, and then worked up as described in Example 1. The residue thus obtained was rubbed with methanol, filtered by suction and dried. The dry product (9.4% $OCH_3$; ultraviolet inactive) melts at 77°–81° C. and is treated, as described in Example 1, with hydrogen chloride gas in chloroform, processed, and recrystallized. The yield is 2.9 gms. The recrystallized 2 - chlor - $\Delta^1$ - androstene-17β-ol-3-one melts at 221°–222° C. The ultraviolet reading is $\epsilon_{248}$= 9500. The mixed melting point with the compound obtained in Example 1 showed no depression.

*Example 3*

50 mg. of 2-chlor-$\Delta^1$-androstene-17β-ol-3-one, 0.2 ml. of pyridine, and 0.1 ml. of acetic anhydride were heated on the steam bath for 2 hours. This solution was then stirred into ice water. The precipitated 2-chlor-$\Delta^1$-androstene-17β-ol-3-one-17-acetate was filtered by suction and recrystallized from isopropyl ether. It melts at 156° C.

*Example 4*

576 mg. of $\Delta^1$-androstene-17β-ol-3-one were dissolved in 8 cc. of chloroform, 0.8 cc. of acetic acid were added thereto and then under ice cooling there was added dropwise with stirring over a period of 30 minutes 335 mg. bromine in 9.4 cc. chloroform. After stirring for another 30 minutes, the solution is diluted with methylene chloride, washed until neutral with water, the solution is dried over sodium sulfate and evaporated to dryness in vacuo. The solid residue, treated with 5 cc. of dry pyridine, is allowed to stand overnight at room temperature with exclusion of moisture, the solution is then washed with water and dried over sodium sulfate. After evaporating to dryness the solid residue is recrystallized from ethyl acetate and there are thus obtained 470 mg. of 2-brom-$\Delta^1$-androstene-17β-ol-3-one with a melting point of 216°–218.5° C.; $D^{26.5}$:+ 29.9° (c.=0.92; $CHCl_3$), U.V. $\epsilon_{255}$=7450.

*Example 5*

1.15 g. of $\Delta^1$-androstene-17β-ol-3-one were dissolved in 70 ml. tetrahydrofuran to which there was added at —60° C. 6.1 ml. propionic acid which contained 312 g. chlorine. This solution was stored in the dark at this temperature for 6 hours and then stirred into ice water. The aqueous solution was then extracted repeatedly with methylene chloride. The methylene chloride phase was washed with sodium bicarbonate solution and finally with water. After drying over sodium sulfate it is evaporated to dryness in vacuo and the residue is taken up with 6 ml. of pyridine. After standing 19 hours it is diluted with ether, washed with 2 N HCl and finally with water. After drying over sodium sulfate and evaporation of the ether solution the residue is recrystallized from ethyl acetate. There is obtained 800 mg. of 2-chlor-$\Delta^1$-androstene-17β-ol-3-one of m. pt. 221°–222° C. U.V. $\epsilon_{248}$=9500.

*Example 6*

639 mg. of 1-methyl-$\Delta^1$-androstene-17β-ol-3-one is dissolved in 38 ml. of tetrahydrofuran and cooled to —60° C. There is added to this solution 165 mg. of chlorine in 1.9 ml. propionic acid. The temperature is allowed to rise to —32° C. in the course of 6 hours and the solution is then stirred into ice water. It is extracted with methylene chloride, and the methylene chloride phase is washed with sodium bicarbonate solution and finally with water. After evaporation to dryness in vacuo the residue is stored overnight in 4 ml. pyridine at room temperature. It is then diluted with ether, and washed with dilute hydrochloric acid and with water. After drying the ether phase over sodium sulfate it is evaporated to dryness in vacuo and the residue chromatographed over silica gel. By elution with equal amounts of carbon tetrachloride and methylene chloride, there is obtained 2-chlor-1-methyl-$\Delta^1$-androstene-17β-ol-3-one, which after recrystallization from isopropyl ether, melts at 156°–157° C. U.V. $\epsilon_{203}$=2180, $\epsilon_{257}$=10360.

*Example 7*

302 mg. of 17α-methyl-$\Delta^1$-androstene-17β-ol-3-one in 15 ml. of tetrahydrofuran were treated with 78 mg. chlorine in 1 ml. of propionic acid, as described in Example 5, then further treated with 1.5 ml. pyridine and processed. The 2-chlor-17α-methyl-$\Delta^1$-androstene-17β-ol-3-one is recrystallized from isopropyl ether and melts at 167°–168° C. U.V. $\epsilon_{247}$=9100.

*Example 8*

276 mg. of 19-nor-$\Delta^1$-androstene-17β-ol-3-one (m. pt. 146°–147° C.; U.V. $\epsilon_{229}$=10650) were dissolved in 10 ml. tetrahydrofuran and treated with 78 mg. of chlorine in 1 ml. propionic acid, as described in Example 5; then further treated with 3 ml. pyridine and processed. The product is recrystallized from isopropyl ether. The 2-chlor-19-nor-$\Delta^1$-androstene-17β - ol - 3-one melts at 145–146° C., U.V.$\epsilon_{248}$=9580.

*Example 9*

500 mg. 2-chlor-$\Delta^1$-androstene-17β-ol-3-one were allowed to stand at room temperature for 50 hours in 2 ml. absolute pyridine and 1.5 ml. propionic anhydride, and then stirred into ice water. The precipitation product was filtered by suction and recrystallized from isopropyl ether. 2 - chlor - $\Delta^1$-androstene-17β-ol-3-one-17-propionate melts at 110–111° C. U.V.: $\epsilon_{240}$=9230.

*Example 10*

2.5 g. 2-chlor-$\Delta^1$-androstene-17β-ol-3-one were heated at 125° C. for 90 minutes in 10 ml. absolute pyridine and 5 ml. oenanthic anhydride and then heated at 100° C. for 60 minutes after adding thereto 0.2 ml. of water. The residue remaining after steam distillation was extracted with methylene chloride. The methylene chloride phase was dried over sodium sulfate and evaporated to dryness in vacuum. 2-chlor-$\Delta^1$-androstene-17β-ol-3-one-17-oenanthate melts at 169–171° C. when recrystallized from methanol. U.V.: $\epsilon_{247}$=9300.

We claim:

1. An anabolically active steroid compound exhibiting low androgenic side reactions selected from the group consisting of 2-chlor-$\Delta^1$-androstene-17β-ol-3-one, 2-chlor-1 - methyl - $\Delta^1$ - androstene-17β-ol-3-one, 2-chlor-17α-methyl - $\Delta^1$ - androstene-17β-ol-3-one, and the 17-esters thereof with physiologically tolerable acids selected from the group consisting of inorganic acids and organic carboxylic acids.

2. 2-chlor-$\Delta^1$-androstene-17β-ol-3-one.
3. 2-chlor-$\Delta^1$-androstene-17β-ol-3-one-17-acetate.
4. 2-chlor-1-methyl-$\Delta^1$-androstene-17β-ol-3-one.
5. 2-chlor-17α-methyl-$\Delta^1$-androstene-17β-ol-3-one.

6. Process for the preparation of 2-chlor-$\Delta^1$-androstene-17β-ol-3-ones which comprises reacting 1,2α-oxido-androstane-17β-ol-3-one with a solution of hydrogen chloride in chloroform.

7. Process for the preparation of 2-chlor-$\Delta^1$-androstene-17β-ol-3-ones which comprises treating 1,2α-oxido-androstane-17β-ol-3-one with a mixture of methanol and perchloric acid and then reacting the methanolysis product thus obtained with a solution of hydrogen chloride in chloroform.

8. Process for the preparation of 2-chlor-$\Delta^1$-androstene-17β-ol-3-ones which comprises reacting $\Delta^1$-androstene-17β-ol-3-one with a solution of chlorine in an aliphatic organic acid, and treating the resulting product with pyridine to form the 2-chlor-$\Delta^1$-steroid.

References Cited in the file of this patent

Djerassi et al.: Journal of American Chemical Society (1956), volume 78, page 6389.